(12) United States Patent
Harmon et al.

(10) Patent No.: US 9,363,561 B1
(45) Date of Patent: Jun. 7, 2016

(54) SEAMLESS STREAMING AND FILTERING

(71) Applicant: VidAngel, Inc., Provo, UT (US)

(72) Inventors: Neal Harmon, Provo, UT (US); Jarom McDonald, Spanish Fork, UT (US)

(73) Assignee: VidAngel, Inc., Provo, UT (US)

( * ) Notice: Subject to any disclaimer, the term of this patent is extended or adjusted under 35 U.S.C. 154(b) by 0 days.

(21) Appl. No.: 14/674,364

(22) Filed: Mar. 31, 2015

(51) Int. Cl.
| | | |
|---|---|---|
| *H04N 21/454* | (2011.01) | |
| *H04N 21/4545* | (2011.01) | |
| *H04N 21/4402* | (2011.01) | |
| *H04N 21/439* | (2011.01) | |
| *H04N 21/45* | (2011.01) | |
| *H04N 21/845* | (2011.01) | |

(52) U.S. Cl.
CPC ..... *H04N 21/45457* (2013.01); *H04N 21/4396* (2013.01); *H04N 21/44029* (2013.01); *H04N 21/4532* (2013.01); *H04N 21/4542* (2013.01); *H04N 21/45452* (2013.01); *H04N 21/45455* (2013.01); *H04N 21/8456* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0124789 | A1* | 5/2007 | Sachson | G06Q 30/00 725/117 |
| 2007/0212023 | A1* | 9/2007 | Whillock | G06F 17/30787 386/281 |
| 2010/0023972 | A1* | 1/2010 | Summers | H04H 20/42 725/54 |

* cited by examiner

*Primary Examiner* — Kieu Oanh T Bui
(74) *Attorney, Agent, or Firm* — Strong & Hanni (57) ABSTRACT

A method and system for filtering content streamed over HLS and other streaming technologies are disclosed. A Streaming Filtering Solution may generate a content map for a movie or other content, identifying filterable elements associated with vulgarity, sex/nudity, violence, etc. A filterable element may identify a category and subcategory of content (e.g., "vulgarity": "f---" word), a begin time and end time, and other characteristics. The Streaming Filtering Solution may generate media segment files based on the filterable elements. The Streaming Filtering Solution may obtain a filter with categories and sub-categories of content to exclude or retain when the content is played. When content is requested, the Streaming Filtering Solution may apply the filter to the media segment files to determine that some media segment files should be dynamically generated based on the filter. The Streaming Filtering Solution may dynamically generate one or more filtered media segment files and provide those files to a requester. Depending on the filter, and the characteristics of a particular filterable element, a filtered media segment file may have fully or partially muted audio, or may have fully or partially cropped video, or may be entirely omitted, or may have other filtering effects applied.

32 Claims, 9 Drawing Sheets

```
302 ─── #EXTM3U
304 ─── #EXT-X-PLAYLIST-TYPE:VOD
306 ─── #EXT-X-TARGETDURATION:10
308 ─── #EXT-X-VERSION:3
310 ─── #EXT-X-MEDIA-SEQUENCE:0
312 ─── #EXTINF:10.0,
314 ─── http://example.com/movie1/fileSequenceA.ts
316 ─── #EXTINF:10.0,
318 ─── http://example.com/movie1/fileSequenceB.ts
320 ─── #EXTINF:10.0,
322 ─── http://example.com/movie1/fileSequenceC.ts
324 ─── #EXTINF:9.0,
326 ─── http://example.com/movie1/fileSequenceD.ts
328 ─── #EXT-X-ENDLIST
```

| Filter Categories | Subcategories |
|---|---|
| vulgarity<br>410 | "f---"<br>"sh--"<br>"b----" |
| sex/nudity<br>420 | implicit sex<br>explicit sex<br>female upper frontal nudity<br>female lower frontal nudity<br>male lower frontal nudity<br>male upper frontal nudity |
| violence<br>430 | kicking/punching<br>swordplay<br>gunplay<br>blood<br>extreme gore<br>mass destruction |
| drama<br>440 | death<br>horror<br>high-speed action<br>tension<br>yelling |
| alcohol/drugs<br>450 | drinking alcohol<br>smoking marijuana<br>snorting cocaine<br>needle usage<br>drunkenness<br>being high |

Figure 4

| time (min:sec) | audio channels | video location | category | sub-category | description |
|---|---|---|---|---|---|
| 50:00.0 – 50:20.0 | | | no filterable content | | |
| 50:20.0 – 50:20.5 | all | | vulgarity | "f—" | |
| 50:20.5 – 50:21.0 | | | no filterable content | n/a | |
| 50:21.0 – 50:21.5 | front right | | vulgarity | "sh—" | |
| 50:21.5 – 50:45.0 | | | no filterable content | n/a | |
| 50:45.0 – 50:46.0 | front right, front left | upper left quadrant | drama | gun | gun being wielded, aimed, and fired |
| 50:46.0 – 50:47.0 | front center | upper right quadrant | violence | gore | upper right portion of the video shows head being blown off by gunshot; significant blood and violence |
| 50:47.0 – 53:13.0 | | | no filterable content | n/a | |
| 53:13.0 – 55:27.5 | all | all | sex/nudity | sex scene | |

Figure 5

| Category | Sub-category | Preference |
|---|---|---|
| sex/nudity | | crop if possible, otherwise omit |
| vulgarity | "f---" | if possible, mute word but not other sound; otherwise mute all sound |
| vulgarity | "hell" | if possible, decrease volume of word by 50%, but not other sound; otherwise decrease volume of all sound by 50% |
| alcohol/drugs | smoking marijuana | allow |
| alcohol/drugs | snorting cocaine | crop if possible, otherwise omit |
| violence | gore | crop if possible, otherwise omit |
| violence | physical beating | blur or crop |

SEAMLESS STREAMING AND FILTERING

BACKGROUND OF THE INVENTION

In the age of streaming, users consume a significant amount of content through streaming technologies. As used herein, "content" may be audio, visual, audiovisual, or any type of content amenable to streaming. In general, streaming refers to providing content to a client over a network, where client consumes the content, in general, as it is received. Streaming may be implemented as a server-client architecture, peer-to-peer architecture, or combination or variant of architectures for which streaming may be appropriate or beneficial. In a server-client architecture, a server streams content to a client. In a peer-to-peer architecture, one peer (acting in a sense as a "server") streams content to another peer (acting in a sense as a "client"). In general, in any other variant of network or architecture, a streaming device ("server") streams content to a receiving device ("client").

In a streaming application, the content is provided real-time, or at least in part real-time. "Real-time" generally refers to providing content at or around the time it will be consumed, as opposed to content that may be provided for subsequent consumption. Watching a video clip on YouTube™ is an example of real-time streaming. Downloading a file such as an MPEG for subsequent consumption, e.g., several hours or days after the download is complete, is an example of non-real-time consumption. Many variants and implementations of real-time and non-real-time applications are well-known in the art.

Many consumers of content desire to filter the content. Filtering may be desirable for a wide array of reasons: to remove objectionable material (e.g., mature content, nudity, vulgarity, obscenity, boring parts, etc.), to view an abbreviated version of content because of time constraints, to analyze the role of a particular character by viewing only the segments in which he appears, for language learning applications, and for any other purpose for which filtering may be appropriate, necessary, or effective.

Currently, consumers are not able, however, to satisfactorily filter streamed content. Some existing client-side filtering technologies work by simply omitting entire segments of streamed content, resulting in a choppy viewing, listening, or other type of consuming, experience. For example, Clearplay™ and VidAngel™ currently provide client-side filtering solutions.

Several hardware-based non-streaming filtering solutions exist, but they suffer from numerous drawbacks, including but not limited to: requiring a user to give up the convenience, wide availability, and other benefits of streaming; requiring a user to purchase expensive dedicated content playback hardware to carry out the filtering; and undesirable choppiness that often results when filtering is implemented by skipping an entire segment of a movie or other content.

HTTP Live Streaming ("HLS") is quickly becoming the leading standard for content streaming. There is a need for a filtering solution for HLS and for other streaming technologies.

A further need exists for a filtering solution that satisfies the Family Home Move Act of 2005, codified at 17 U.S.C. §110 (11). The Family Home Movie provides that it is not copyright infringement to "mak[e] imperceptible, by or at the direction of a member of a private household, [ ]limited portions of audio or video content of a motion picture, during a performance if transmitted to that household for private home viewing, from an authorized copy of the motion picture, or [to] creat[e] or provi[de] a computer program or other technology that enables such making imperceptible and that is designed and marketed to be used, at the direction of a member of a private household, for such making imperceptible, if no fixed copy of the altered version of the motion picture is created by such computer program or other technology."

Among other requirements, to be eligible for protection under the Family Home Act, a technology may not "create a fixed copy of the altered version." The Streaming Filtering Solution disclosed herein, in at least some embodiments, functions without creating a fixed copy of an altered version of streamed content.

BRIEF SUMMARY OF THE INVENTION

A Streaming Filtering Solution is disclosed for smoothly filtering content streamed over HLS, as well as over other streaming technologies. In addition to improving the smoothness of content streaming, the disclosed Streaming Filtering Solution facilitates compliance with the Family Home Movie Act of 2005, which allows for the "making imperceptible" of content, i.e., filtering, in a private home if no "fixed" copy of the filtered content is made.

HTTP Live Streaming ("HLS") streams content, e.g., movies, by dividing the content into a series of short media segment files. The server provides an HLS index file to a client. The HLS index file identifies the media segment files comprising the content. The client requests each of the media segment files identified in the HLS index file, and the server transmits each media segment file upon the client's request.

The disclosed Streaming Filtering Solution may generate a content map for a movie, the content map identifying all parts of the movie with filterable content, i.e., vulgarity, sex/nudity, violence, etc. The content map may describe a filterable element by identifying a category and subcategory (e.g., Vulgarity (category): "f---" (subcategory)), a begin and end time of the filterable element, one or more audio channels containing filterable audio content, an area of the display containing filterable visual content, and other characteristics of the filterable element. The content map may be generated in a variety of ways, e.g., by a human who watches a movie and documents the characteristics of filterable elements in the movie; through a community or crowd-based approach; programmatically; or in any other way by which filterable elements may be identified.

When a client requests the movie, the Streaming Filtering Solution may obtain a set of preferences, e.g., a filter, to apply to the requested movie. Preferences may be based on a particular user or person, or the physical location to which content is being streamed, or any other criteria for determining how to filter content. Preferences may include categories (and subcategories) of content to include (not filter) or exclude (filter), and may also include directions on specific means of filtering. For example, preferences may indicate that the "f---" should be entirely muted, but that, for the "crap" word, the volume should be merely turned down halfway.

In response to receiving a client request for streamed content, the Streaming Filtering Solution may provide an HLS index file to the client. The media segment files identified in the HLS index file may track the segments identified as filterable elements in the movie's content map. Some media segment files may be very short, e.g., 0.5 seconds, reflecting, e.g., the length of one swear word comprising a filterable element in the movie's content map. Media segment files may have varying lengths depending on the movie map, length and location of the filterable elements, characteristics of a server, client, or network, or other factors.

As the client requests each media segment file identified in the HLS index file, the Streaming Filtering Solution may determine whether a requested media segment file is associated with a filterable element and, if so, the Streaming Filtering Solution may apply the preferences to the requested media segment file to dynamically generate a filtered media segment file to transmit to the client. For example, if the preferences indicate that the "f---" word should be muted, and a requested media segment file includes the "f---" word, then the Streaming Filtering Solution may dynamically generate a media segment file with the "f---" word muted, and then transmit this filtered media segment file to the client without ever placing the filtered media segment file in fixed storage. In other embodiments, a filtered media segment file may be placed in fixed storage.

Generating a filtered media segment file may comprise omitting the entire segment, omitting one or more chronological segments of the media segment file, completely muting all audio, partially turning down all sound, muting only one or more of all of the audio channels, turning down the sound on one or more of the audio channels, turning up the sound on one or more audio channels, cropping the video, blurring all or part of the video, replacing all or part of the video, or any other audio, visual, or other effect or manipulation known in the art.

DETAILED DESCRIPTION OF THE INVENTION

The Streaming Filtering Solution disclosed herein addresses the above-described shortcomings and needs by providing a solution that uses streaming technologies, including but not limited to the almost ubiquitous HLS technology, to smoothly filter content without the need to acquiring or to use specialized hardware. The invention disclosed herein has the further benefit of compliance, in one or more embodiments, with the copyright laws, specifically the Family Home Movie Act of 2005. The invention disclosed herein further benefits from the ability to edit a streaming segment, such as an HLS media segment file.

Although this disclosure focuses on HLS as an exemplary technology which may be used to implement the disclosed invention, other technologies may also be used. Streaming technologies include, but are not limited to, HLS, MPEG Dash, Microsoft Smooth Streaming, RTP, RTSP, and any other technology used primarily or in part to create, develop, provide, or consume streamed content.

HTTP Live Streaming ("HLS") is an HTTP-based media streaming communications protocol implemented by Apple Inc. as part of its QuickTime, Safari, OS X, and iOS software. It has also become supported by Google Chromecast, Roku, Amazon Fire TV, and other devices and systems. HLS sends audio and video as a series of small files, or "segments," typically of about 9-10 seconds duration, called media segment files. An HLS index file, or playlist, provides an ordered list of the URLs of the media segment files. HLS index files are formatted and saved as extended M3U files, with the extension ".m3u8." The URL of the index file is provided to a client, which then requests and receives the index file. The client processes the index file and requests the indexed files, i.e., the media segment files, in the sequence in which they appear in the index file.

As used herein, "client" refers to any device configured and/or used to receive and/or consume content received from a "server" device over a network. Client devices include, but are not limited to, computers, computer displays, computer speakers, televisions, smartphones, handheld devices, tablets, laptops, projectors, and any other devices for receiving and playing content. Many types of networks and networking technologies, configurations, topologies, and designs are well known in the art.

Figure 3:
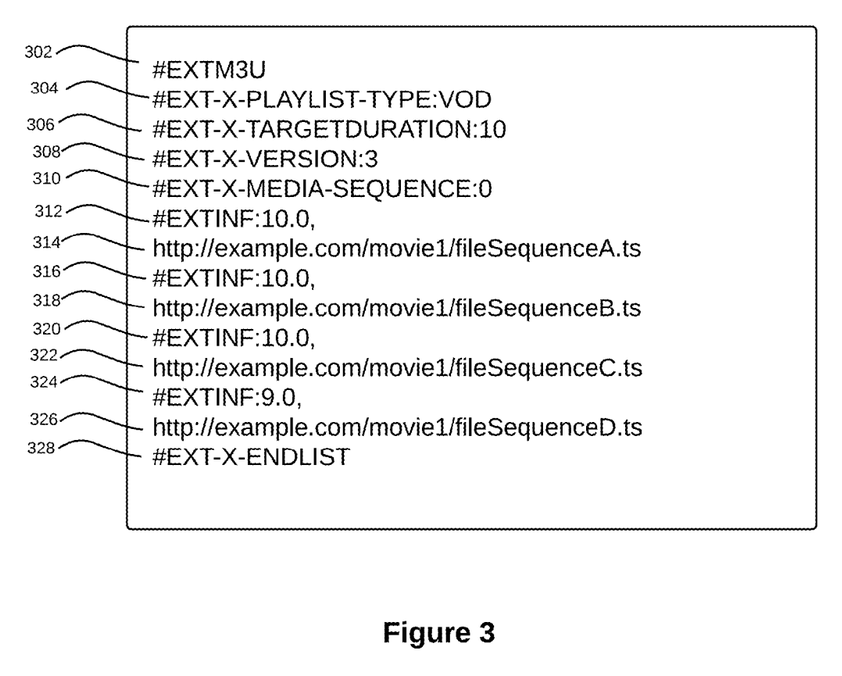
FIG. 3 illustrates an exemplary HLS index file.

FIG. 3 illustrates an exemplary extended M3U, i.e., an m3u8, file. The "EXTM3U" tag distinguishes an extended M3U file from a basic M3U file. The "EXTINF" tag in lines 312, 316, 320, and 324 is a record marker that describes the media file identified by the URL that follows it. Each media file URL must be preceded by an EXTINF tag. The EXTINF tag contains a "duration" attribute that is an integer or floating-point number in decimal positional notation that specifies the duration of the media segment in seconds. As noted above, the typical duration is 9-10 seconds. Currently available HLS implementations (e.g., Amazon Elastic Encoder, Zencoder) employ a standard segment length that does not vary over multiple segments, such that all segments have the same duration.

The "EXT-X-TARGETDURATION" tag specifies the maximum duration of any HLS segment. The "#EXT-X-TARGETDURATION:10" tag on line 306 limits HLS segments to a maximum of 10 seconds.

The "EXT-X-PLAYLIST-TYPE" tag identifies the type of a session. The "EXT-X-PLAYLIST-TYPE:VOD" tag on line 304 indicates that this playlist is a video-on-demand playlist.

The "EXT-X-MEDIA-SEQUENCE" tag indicates the sequence number of the first URL that appears in a playlist file. The "EXT-X-MEDIA-SEQUENCE:0" tag on line 310 indicates that the first URL in the playlist file will have the sequence number zero "0" (zero).

The "EXTINF" tag is a record marker that describes the media file identified by the URL that follows it. Each media file URL must be preceded by an EXTINF tag. The EXTINF tag contains a "duration" attribute that is an integer or floating-point number in decimal positional notation that specifies the duration of the media segment in seconds. In FIG. 3, the first EXTINF entry on line 312, "#EXTINF:10.0," indicates that the file referenced on the following line, i.e., line 314, "http://example.com/movie1/fileSequenceA.ts," has a duration of 10.0 seconds.

The index file, or playlist, provides an ordered list of the URLs of the media segment files. A client requests and processes the index file (or playlist), and based on this index file requests the indexed files, i.e., the media segment files, in the sequence in which they appear in the index file.

The Streaming Filtering Solution disclosed herein provides a solution for filtering HLS content by varying the duration of the HLS media segment files based on filter tags, and by independently filtering each media segment file, as appropriate. The Streaming Filtering Solution may set the duration of a media segment file anywhere in the range of 0.1 seconds up to 9 seconds. The Streaming Filtering Solution may set a duration for a media segment file of less than 0.1 seconds or over 9 seconds based on the needs and capabilities of HLS and particular implementing devices.

A content map is a mapping of content, e.g., of a movie, identifying some or all parts of the content that may be filtered. For example, the content map may identify time periods during the movie which may be filtered for language, e.g., the "sh--" word at minute:second marker 45:39.5-45:40; or time periods during the movie which may be filtered for nudity/sex, e.g., a sex scene at minute:second marker 24:21-27:35; or time periods during the movie which be filtered for violence, e.g., a violent scene at minute:second marker 99:15-99:23 in which a man is graphically decapitated. In general, a content map is simply a mapping that identifies segments and characteristics of filterable content. A content map entry may include identification of the temporal (e.g., minute markers during the movie), spatial (e.g., area of display to be cut, cropped, kept, blurred, or otherwise filtered), audible (e.g., channels or other content aspects containing filterable content) dimensions of filterable content in the movie (or other type of content), or other characteristics of a particular filterable element.

A content map may be implemented in many ways which are well-known and easily attainable to a person of ordinary skill in the art.

In one embodiment, a content map may be implemented all or in part as a set of filterable elements, wherein each filterable element identifies content that may be filtered, a description of the content sufficient to perform filtering (e.g., begin time and end time markers within movie or content, spatial markers such as location on display filterable content, audio characteristics such as channels, etc.). A filterable element may be implemented, stored, or processed in numerous ways well-known and accessible to a person of ordinary skill, as long as the information associated with the filterable element is sufficient to perform one or more filtering actions.

In one embodiment, a content map may assign a filter category to some or all of the items of filterable content in a movie or other content. A filter category may be any of "action," "dramatic," "scary," "alcohol/drugs," "vulgarity," "sex/nudity," "violence," "boring part," "other negative element," "unnecessary scene," or any other category for which it may be useful, desirable, or appropriate to filter. Subcategories (at multiple levels, i.e., sub-, sub-sub-, etc.) may also be applied. For example, the category "vulgarity" may have the subcategories "f---," "sh--," "b----," etc. Subcategories may similarly be applied to other categories.

Figure 2:
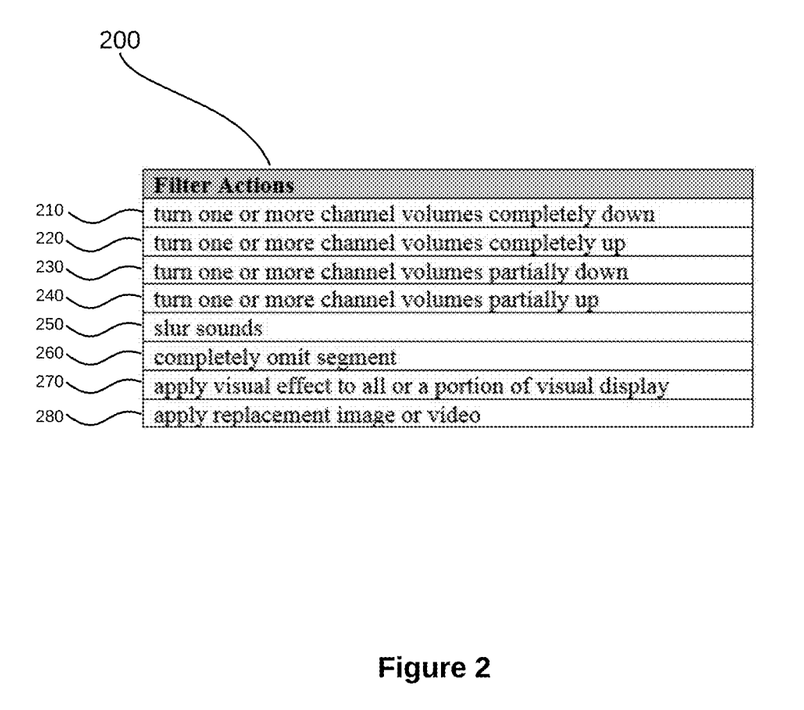
FIG. 2 illustrates several exemplary filter actions.

Implementing a content map may further include, in one embodiment, assigning one or more filter actions to each filterable element. A filter action may be any of skipping a filterable element in its entirety, completely or partially decreasing or increasing the volume on one or more audio channels for some or all of the duration of the filterable item, applying a visual effect to all or a portion of the filterable element for some or all of the duration of the filterable element, providing a substitute frame or frames for all or a portion of the duration of the filterable element, any combination of these actions, or any other action that may comprise filtering on some or all of a filterable element. One or more substitute frames may come from within the streamed content or from a source other than the streamed content. A visual effect may be any effect or combination of effects including but not limited to blocking out all or a part of the visual part of a filterable element, blurring all or a part of the visual part of a filterable element, replacing all or a part of the visual part of a filterable element, cropping the visual part of a media segment file such that the undesirable element is imperceptible in the cropping result, or any other visual effect well-known in the art. FIG. 2 illustrates several exemplary filter actions 210-280.

Figure 5:
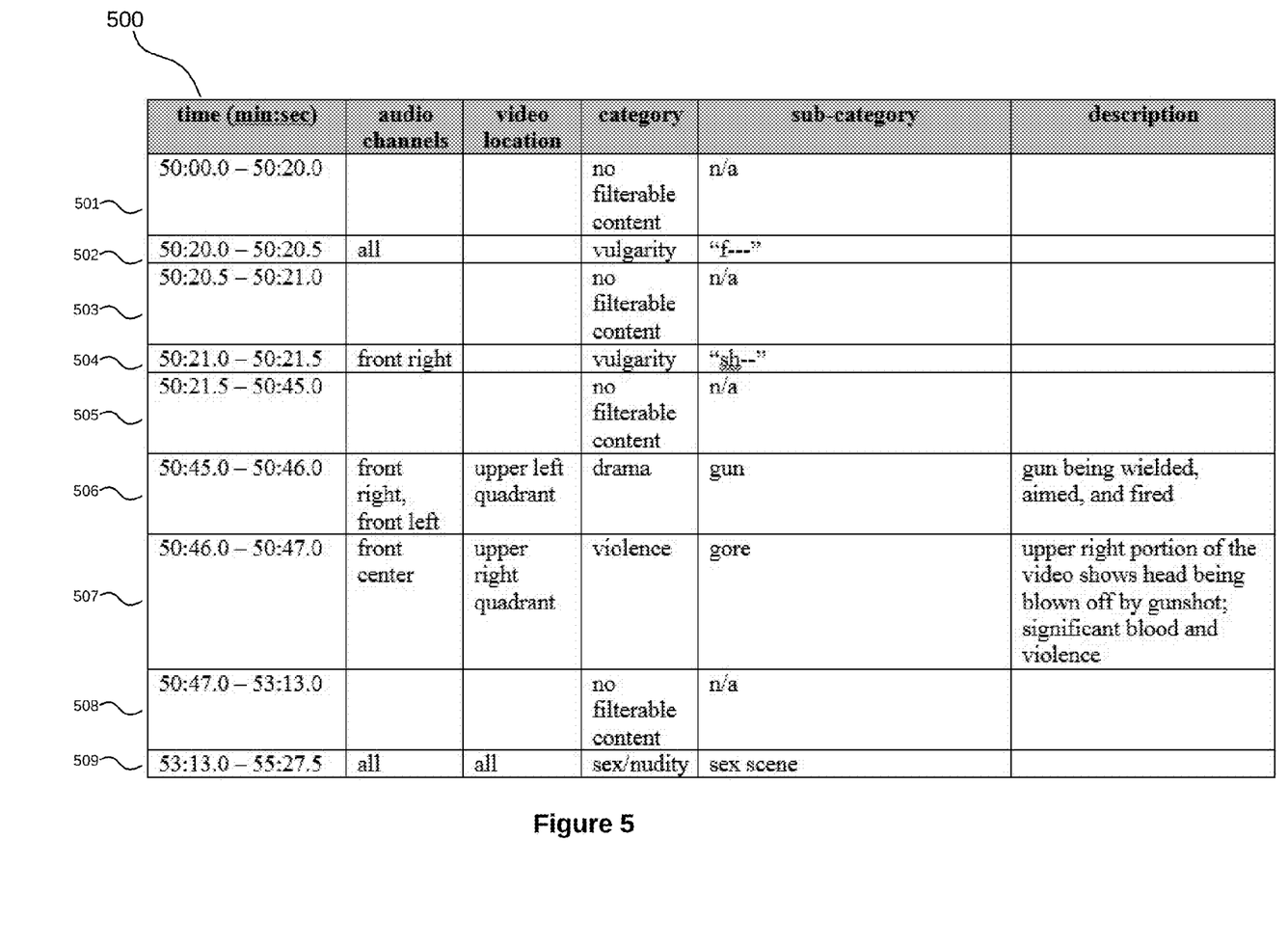
FIG. 5 illustrates an exemplary content map for a movie.

FIG. 5 illustrates an exemplary content map 500 from a movie in which there are several swear words (entries 502 and 504); a gun is drawn, aimed, and fired (entry 506); the gunshot graphically blows off a character's head (entry 507); and, a short while later, there is a graphic sex scene (entry 509).

Figure 4:
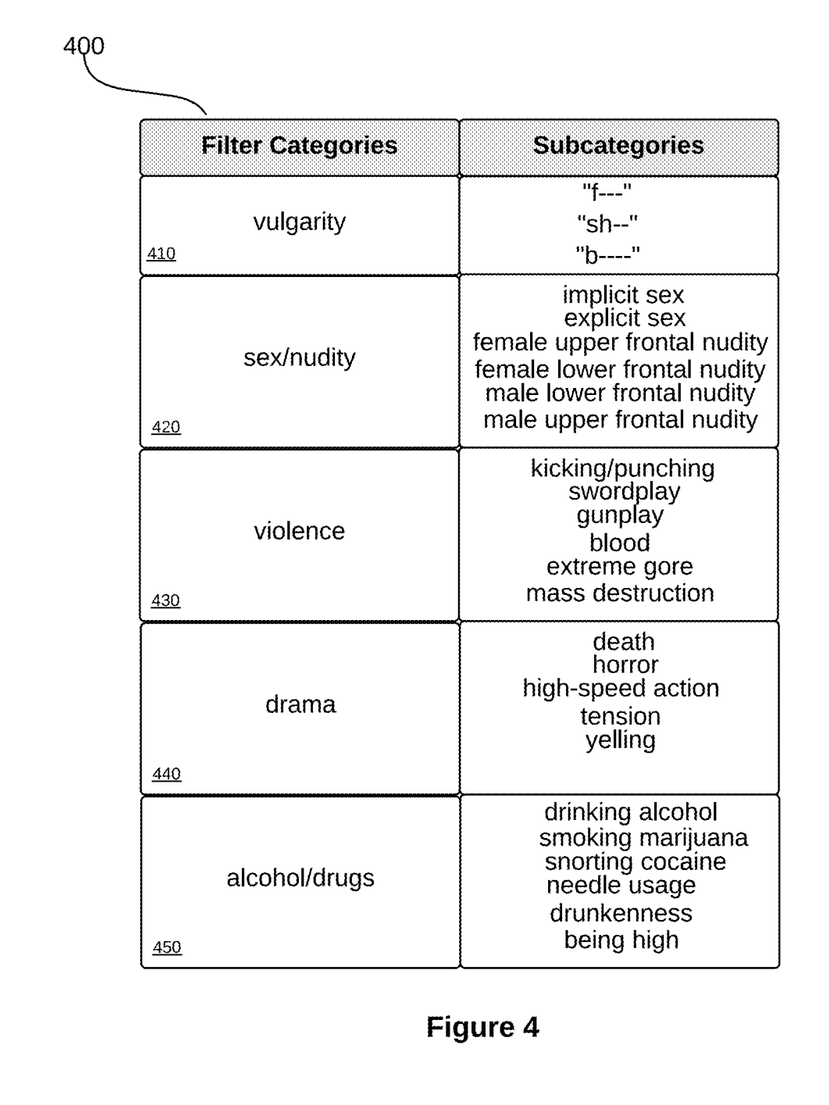
FIG. 4 illustrates exemplary filter categories and subcategories.

A content map may be generated in a variety of ways. In one embodiment, a human filtering agent may watch the movie and manually create, such as by writing down or entering into computer software, the time segments of the movie which contain potentially filterable content. The human filtering agent may also assign a filter category from filter categories 400 to each time segment containing potentially filterable content. Although not depicted in FIG. 5, it is possible that more than one filter category could be assigned to one segment, e.g., violence and vulgarity could both be assigned to a segment showing a graphic decapitation while the decapitator is swearing.

A content map may also be created through a community or crowd-based approach wherein multiple filter agents identify and review segments and assign filter categories.

The Streaming Filtering Solution may filter content by applying a filter to a content map to generate a set of media segment files. The Streaming Filtering Solution may then generate an HLS index file for the generated media segment files.

A filter may comprise a specific user's preferences, rules based on location (e.g., content streamed to an elementary school or prison may always have minimum filtering requirements, such as no nudity), or any other set of rules or preferences defining content which should and should not be filtered, or how particular content should be filtered. For example, a filter may indicate that vulgarity that is less bad, e.g., "crap" (as opposed to "f---"), should merely have the volume turned down but does not need to be completely muted. A filter may also indicate that nudity does not need to be completely cropped or omitted, but that it can be merely blurred, the extent of which may be specified in the filter.

As a client requests the media segment files based on the HLS index file, the Streaming Filtering Solution provides the requested media segment files. The Streaming Filtering Solution may generate the filtered media segment files either on the fly, i.e., when the client requests the file, or at some point in advance and store the filtered media segment files in non-fixed memory up through the time when the client requests the media segment file.

The Streaming Filtering Solution may store customized media segment files in fixed storage, un-fixed storage, some combination of the two, or any other well-known storage scheme. Fixed storage may comprise any type of storage designed, intended, and capable of permanent storage. Some examples of fixed storage may include, but are not limited to, a hard disk drive, tape drive, CD, or floppy disk. Although these exemplary storage media are often employed in fixed storage application, they may comprise part of an unfixed storage solution. For example, in a virtual memory application wherein part of virtual memory is stored to a hard disk, the hard disk in this instance may be viewed as unfixed storage because it mimics unfixed storage, i.e., it may mimic volatile memory.

"Non-fixed" storage may include, but is not limited to, cache, volatile memory, volatile memory that may be partially or wholly implemented in non-volatile memory, and any other data storage not intended and/or designed to be permanent. For example, caching technologies that regularly refresh, e.g., every 24 hours, are not fixed.

The content map 500 in FIG. 5 includes several segments with content that may be filtered.

Figure 6:
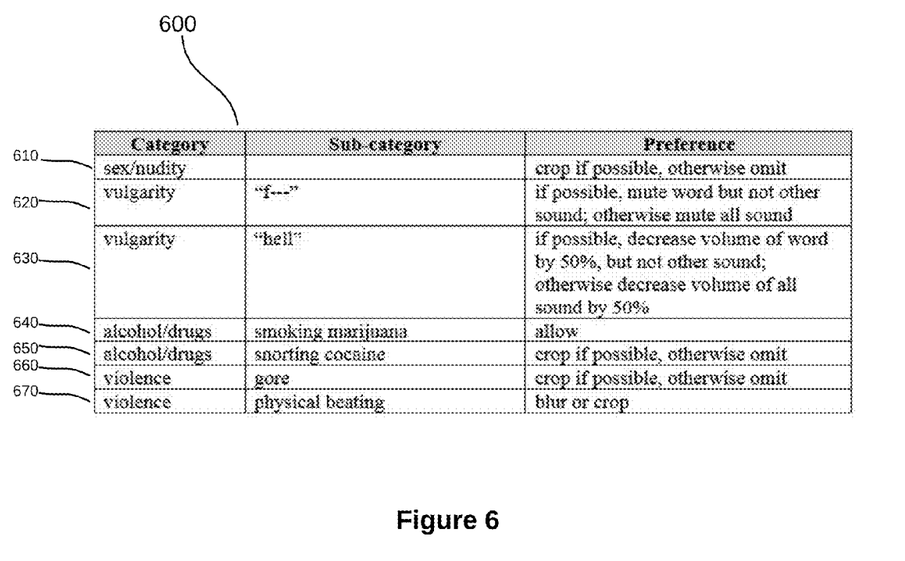
FIG. 6 illustrates an exemplary filter comprising user preferences.

FIG. 6 illustrates an exemplary filter 600 comprising user preferences. For example, preference 610 indicates that nudity should be cropped out of the display if possible, or otherwise entirely omitted. Preference 620 indicates that the volume for the channel with "f---" should turned all the way down, but the other sound channels should be unchanged. Preference 630 indicates that "hell" should be quieted by decreasing by 50% the volume of the channel containing "hell," and that if it is not possible to decrease the volume of "hell" while leaving the other sounds unchanged, then the volume of all sounds should be decreased 50%. Preference 640 indicates that it is permissible to show smoking marijuana. A filter may explicitly characterize particular content as allowable, or it may simply omit a filter for particular content, or it may employ any other means to indicate that a particular class or category of content is allowable. Preference 650 indicates that snorting cocaine should not be shown. If possible, the scene should be cropped so that cocaine snorting is not visible but the remainder of the scene is visible. If cropping is not possible, the cocaine snorting should be omitted. Preference 660 indicates that gory violence should not be shown. If possible, the scene should be cropped so the gore is not visible but the remainder of the scene is visible. If cropping is not possible, the gore should be omitted. Preference 570 indicates that physical beating does not need to be entirely cropped or omitted if it can be blurred. Otherwise, the physical beating should be cropped if possible, or otherwise entirely omitted.

The Streaming Filtering Solution may apply the filter, e.g., user preferences, and content map to the content to generate media segment files. In one embodiment, the Streaming Filtering Solution may iterate through one or more preferences from the user preferences, comparing each preference with each filterable element comprising the content map. When the Streaming Filtering Solution determines that a preference matches a filterable element, it generates, from the content, a media segment file that is filtered based on the filterable element and the preference.

For example, Streaming Filtering Solution may iterate through preferences 600, comparing each preference to filterable elements 502, 504, 506, 507, and 509 in content map 500. In one example, the Streaming Filtering Solution may determine that preference 610 matches filterable element 509 because preference 610 is for all of category "sex/nudity," and filterable element 509 is from the same category of "sex/nudity." The Streaming Filtering Solution may further determine that preference 620 matches filterable element 502 because preference 620 is for the category "vulgarity," sub-category "f---," and filterable element 502 is for the same category and sub-category. The Streaming Filtering Solution may further determine that preferences 630, 640, 650, and 670 do not match any of filterable elements 500. The Streaming Filtering Solution may determine that preference 660 matches filterable element 507 because preference 660 is for category "violence" sub-category "gore," and filterable element 507 is for the same category and sub-category.

When the Streaming Filtering Solution determines that a preference matches a filterable element, it may generate a media segment file based on that match. For example, based on the determination that preference 620 matches filterable element 502, the Streaming Filtering Solution may determine to generate media segment file of duration 0.5 seconds, comprising the time markers 50:20.0-50:20.5 associated with filterable element 502. The Streaming Filtering Solution will apply the user preference to mute the channel with the "f---" if possible, or to otherwise mute all sound. In one embodiment, filterable element 502 may identify that the "f---" is audible on "all" channels, and the Streaming Filtering Solution may completely turn down the volume on all audio channels. A filterable element identify any combination of the front-center channel, the front-left channel, the front-right channel, the rear-left channel, the rear-channel, or any other channel identifier in an audio channeling system. In another embodiment, filterable element 502 may not identify an audio channel on which "f---" is played, or the particular format of the content may not have separate audio channels. In this embodiment, the Streaming Filtering Solution may completely turn down the volume on all of the audio.

Figure 1:
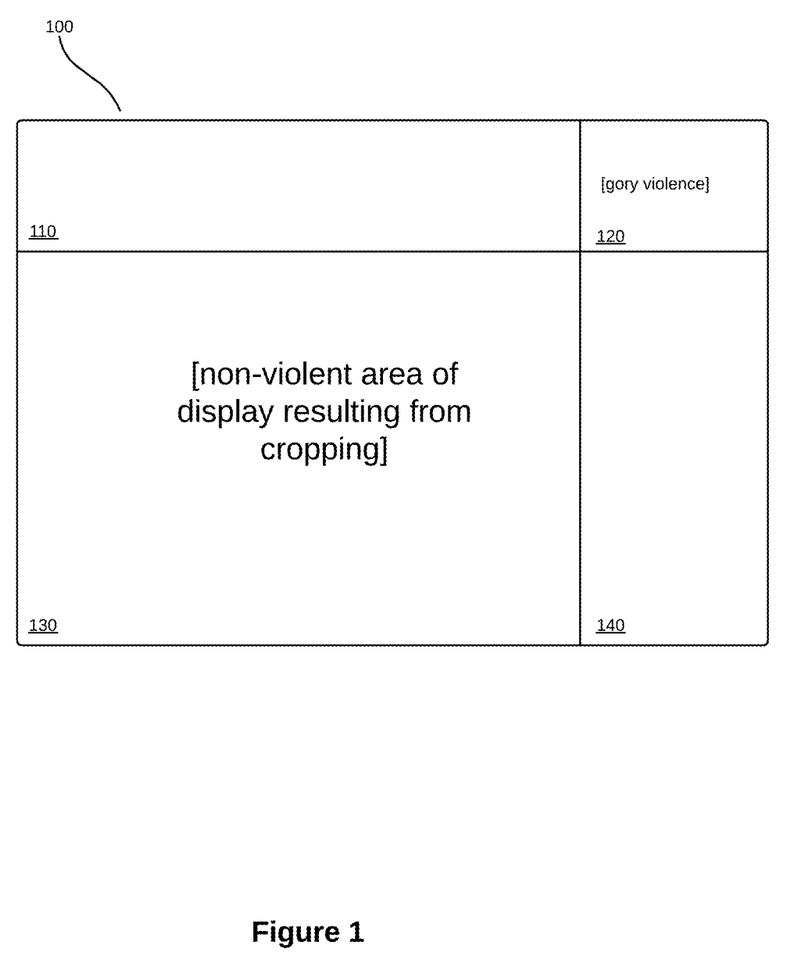
FIG. 1 illustrates a visual display where one portion of the display contains filterable violence, but the remainder of the display does not include any violence.

The Streaming Filtering Solution may also, based on a determination that preference 660 matches filterable element 507, determine to generate a media segment file of duration 1.0 seconds, comprising the time markers 50:46.0-50:47.0 associated with filterable element 507. The Streaming Filtering Solution may apply preference 660 to either crop the undesirable violence-gore content, or to entirely omit time markers 50:46.0-50:47.0. FIG. 1 illustrates one embodiment in which filterable element 507 may identify the location in the display 100 where the violence-gore is shown, for example, the area 120 of the display 100 comprising the intersection of the right 25% and the upper 25%. In this embodiment, the Streaming Filtering Solution may determine to crop the display so that only the area 130 comprising the intersection of the left 75% and the lower 75% is visible in the generated media segment file. Streaming Filtering Solution may also determine to partially or fully turn down the audio on the front center channel which, as identified in filterable element 507, is the audio channel on which the noise of the violence in filterable element 507 is played.

In another embodiment, filterable element 507 may not identify the area of the violence-gore, or the violence-gore may comprise the entire display area. In this embodiment, the Streaming Filtering Solution may omit the entire segment, i.e., the Streaming Filtering Solution may not generate a media segment file for time markers 50:46.0-50:47.0.

Many tools and techniques are well-known and easily accessible to a person of ordinary skill for generating media segment files and altering the content, when necessary, to apply preferences to a filterable element. Such tools include, but are not limited to, FFmpeg and ImageMagick. Other similar software and techniques are well-known and readily available.

The media segment files that do not require filtering, i.e., do not require applying a preference to a filterable element to edit content, may be generated in advance and may be placed in fixed or non-fixed storage. In one embodiment, the media segment files that do not require filtering may include media segment files generated for elements 501, 503, 505, and 508 of content map 500. As further described herein, many factors may affect how the Streaming Filtering Solution segments a movie or other content into media segment files.

Media segment files that have been altered from the original content to reflect a preference applied to a filterable element, or by any other means for altering, may be generated in non-fixed memory or storage when requested by a client. The altered media segment files may be generated in advance of a client request, but they are generally stored in non-fixed memory, for reasons explained below relating to the Family Home Movie act. In some embodiments, the altered media segment files may be stored in fixed storage, depending on the circumstances and other constraints and factors.

The Streaming Filtering Solution may employ any of numerous different approaches, schemes, or algorithms, which are well-known and/or easily within the grasp of a person of ordinary skill, for generating media segment files for content. In one exemplary scheme, the Streaming Filtering Solution may identify all filterable elements that match one or more preferences. The Streaming Filtering Solution may then generate a media segment file for each identified filterable element, by applying the matching preference(s) and filterable element to the content. The Streaming Filtering Solution may then generate media segment files for the remainder of the content by generating media segment files with a default duration, e.g., 9 or 10 seconds, and modifying the duration where necessary to accommodate the media segment files generated as a result of identified filterable elements.

In another embodiment, the Streaming Filtering Solution may determine to make all media segment files in the entire content have a uniform duration, e.g., 9 seconds. In this embodiment, edits resulting from matches between preferences and filterable elements may be incorporated into the uniform-duration media segment files. For example, the Streaming Filtering Solution may determine to generate a media segment file for time markers 00:27.0-00:36.0. A preference may match filterable content at 00:28.5-00:29.0, necessitating completely turning down the volume from 00:28.5-00:29.0. The Streaming Filtering Solution may generate a media segment file of duration 9 seconds comprising time markers 00:27.0-00:26.0, wherein the audio volume is unchanged from 00:27.0-00:28.5, the audio volume is completely turned down from 00:28.5-00:29.0, and the audio volume is unchanged from 00:29.0-00:36.0.

It will be appreciated that many approaches, schemes, and algorithms may be applied to segment the content into media segment files, depending on system characteristics and capabilities, network characteristics and capabilities, content characteristics, and any other factor which may favor a particular approach. The employed approach, scheme, or algorithm for segmenting the content into media segment files may even be in whole or in part arbitrary.

Figure 7:
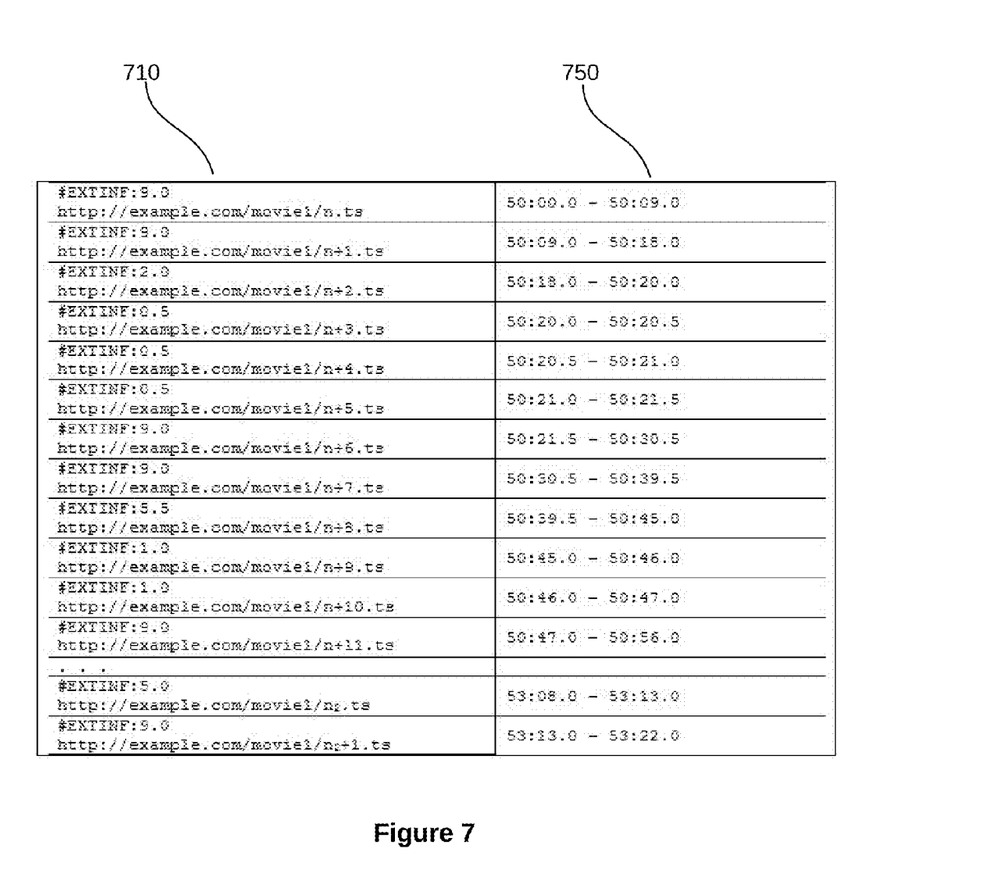
FIG. 7 illustrates a portion of an exemplary HLS index file based on the content map in FIG. 5 and the preferences in FIG. 6.

Once media segment files have been generated for the content, the Streaming Filtering Solution generates an index file for the media segment files. FIG. 7 illustrates the portion of an exemplary HLS index file for content map 500 and preferences 600, which index file may be generated as a result of comparing filterable elements 500 to preferences 600 and generated media segment files.

Column 710 contains the text from the HLS index file. Column 750 is annotations (not actually part of the HLS index file) indicating the time excerpt to which each media segment file corresponds.

Figure 8:
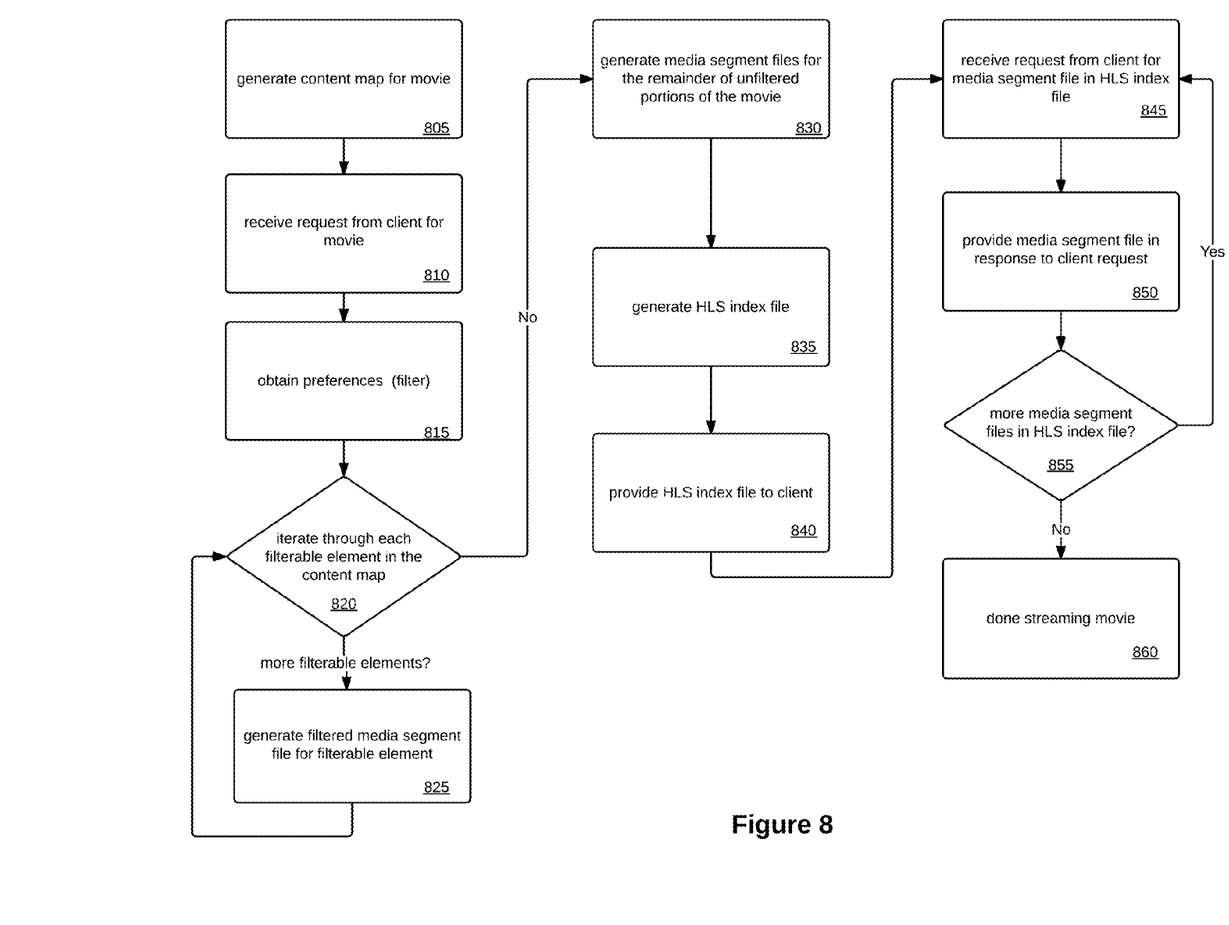
FIG. 8 illustrates a flowchart for one embodiment of practicing the invention.

FIG. 8 is a flowchart illustrating one embodiment for practicing this invention.

At step 805 the Streaming Filtering Solution generates a content map for content, such as a movie. As described above, in some embodiments the content map may comprise a set of filterable elements.

At step 810, the Streaming Filtering Solution receives a request from a client to stream the movie.

At step 815, the Streaming Filtering Solution obtains a filter, in this example in the form of preferences. The preferences may be received from the client, obtained by having the client respond to a survey regarding preferences, retrieved from storage at the Streaming Filtering Solution or another location accessible to the Streaming Filtering Solution, or generated based on some criteria or preference generation algorithm, or aggregated from disparate sources, or obtained using any scheme for obtaining, developing, or generating a filter or set of preferences.

At step 820, the Streaming Filtering Solution may iterate through each filterable element in the content map. While at least one filterable element remains, the Streaming Filtering Solution at step 825 may generate a media segment file for a filterable element. As described above, generating a media segment file may comprise comparing a filterable element with each preference, and then determining to apply a matching preference to generate a media segment file by editing the content in some manner, or possibly by determining to entirely omit the content associated with the filterable element, and in this case not generating a media segment file.

At step 830, after the Streaming Filtering Solution has iterated through each filterable element in the content map, and generated all necessary media segment files for the filterable elements, the Streaming Filtering Solution may generate media segment files for the remainder of the movie, i.e., the content not associated with filterable elements.

At step 835, the Streaming Filtering Solution may generate an HLS index file associated with the filtered content, i.e., an HLS index file including a URL for each generated media segment file.

At step 840, the Streaming Filtering Solution responds to the client's request to stream the movie by providing the HLS index file to the client. The HLS index file may be provided over HTTP, but may also be provided over any other well-known network or data transfer technology.

At step 845, the Streaming Filtering Solution may receive a request from the client for a media segment file identified in the provided HLS index file.

At step 850, the Streaming Filtering Solution may respond by providing the requested media segment file. As described herein above, the media segment file may be stored in numerous different ways. The media segment file may be provided over HTTP or any well-known network protocol or technology or data transfer solution.

When the Streaming Filtering Solution determines, at step 855, that the media segment file will not request any additional media segment files for a particular session, the streaming session is complete. The Streaming Filtering Solution may determine that the client will not request additional media segment files in several ways. In one alternative, the Streaming Filtering Solution may determine that the client has already requested all media segment files from the HLS index file. In another alternative, the Streaming Filtering Solution may determine that it has already provided all of the media segment files in the HLS index file. In another alternative, the client may provide an indication to the Streaming Filtering Solution that it is terminating the session or will otherwise not be requesting any further media segment files for the HLS index file. A person of ordinary skill will recognize the many well-known and easily attainable and implementable ways in which the Streaming Filtering Solution may determine that the client will not request any further media files.

Figure 9:
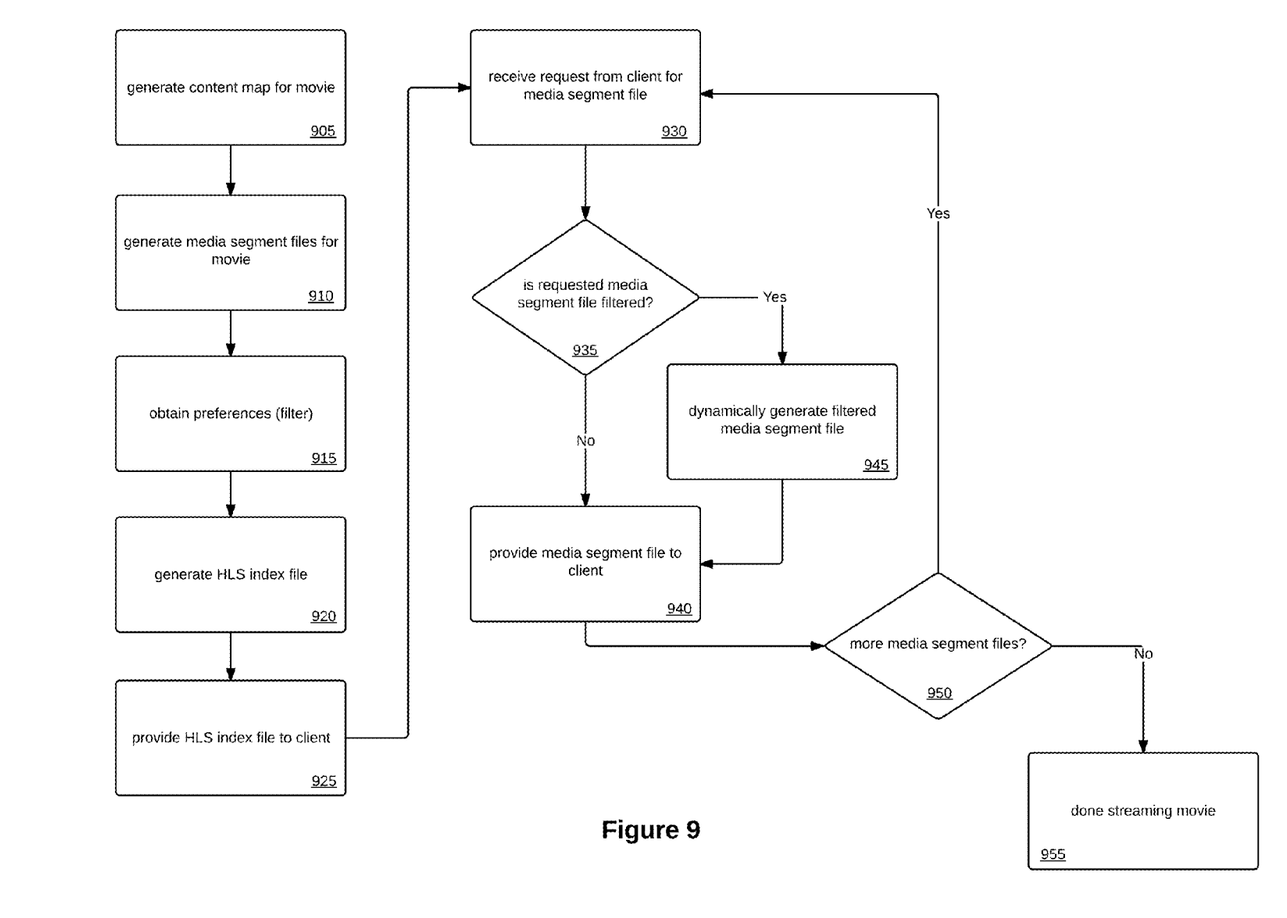
FIG. 9 illustrates a flowchart for another embodiment of practicing the invention.

FIG. 9 is a flowchart illustrating an alternative embodiment for practicing this invention.

At step 905, the Streaming Filtering Solution generates a content map for content, such as a movie. As described above, in some embodiments the content map may comprise a set of filterable elements.

At step 910, the Streaming Filtering Solution generates media segment files for the movie. In one embodiment, the generated media segment files do not reflect, incorporate, or apply any filtering, and instead reflect the movie in an unfiltered state. As described above, the start times, stop times, and lengths of the generated media segment files may track the content map generated at step 905, so that each filterable element may comprise its own segment. In alternative embodiments, the start times, stop times, and lengths of the generated media segment files may partially or generally track the content map generated at step 905.

At step 915, the Streaming Filtering Solution obtains a filter, in this example in the form of preferences. The preferences may be received from the client, obtained by having the client respond to a survey regarding preferences, retrieved from storage at the Streaming Filtering Solution or another location accessible to the Streaming Filtering Solution, or generated based on some criteria or preference generation algorithm, or aggregated from disparate sources, or obtained using any scheme for obtaining, developing, or generating a filter or set of preferences.

At step 920, the Streaming Filtering Solution may generate an HLS index file reflecting the movie segment files generated in step 910. At step 925, the Streaming Filtering Solution may provide the generated HLS index file to a client.

At step 930, the Streaming Filtering Solution may receive a request from the client for a media segment file identified in the provided HLS index file.

At step 935, the Streaming Filtering Solution may determine whether the requested media segment file should be filtered. This determination may be made by applying the preferences obtained in step 915 to the content map, or to information derived from the content map, and thereby determining that the requested media segment file should be filtered. For example, if the preferences indicate that the "f---" word should be muted, and the content map indicates that a particular media segment file contains the "f---" word, then the Streaming Filtering Solution may determine to filter the requested media segment file. In another example, if the preferences indicate that playing the "f---" is acceptable, then the Streaming Filtering Solution may determine to not filter the media segment file even though it contains the "f---" word.

Many approaches may be taken, and are well known, to applying preferences to a media segment file. In another example, a requested media segment file may have multiple filterable elements, e.g., a swear word uttered simultaneously with a violent murder. If a particular set of preferences allows for one but not the other, then the Streaming Filtering Solution may filter sound but not audio, or filter audio but not sound, or filter both audio and sound, or apply some other rule or approach to potentially conflicting preferences for the same media segment file.

If the Streaming Filtering Solution determines that the requested media segment file should not be filtered, then at step 940 it may provide the requested media segment file to the client. The media segment file may be provided over HTTP or any well-known network protocol or technology or data transfer solution.

If the Streaming Filtering Solution determines that a requested media segment file should be filtered, then at step 945 it may dynamically generate a filtered media segment file, as described herein above. For example, generating a filtered media segment file may comprise editing the content of the media segment file in some manner, or possible omitting the entire media segment file. The Streaming Filtering Solution may then, at step 940, provide the dynamically filtered media segment file to the client, as described above.

At step 950, the Streaming Filtering Solution determines whether the client will not request any more media segment files for the movie, i.e., whether the client will not request any more media segment files for a particular streaming session. The Streaming Filtering Solution may determine that the client will not request additional media segment files in several ways. In one alternative, the Streaming Filtering Solution may determine that the client has already requested all media segment files from the HLS index file. In another alternative, the Streaming Filtering Solution may determine that it has already provided all of the media segment files in the HLS index file. In another alternative, the client may provide an indication to the Streaming Filtering Solution that it is terminating the session or will otherwise not be requesting any further media segment files for the HLS index file. A person of ordinary skill will recognize the many well-known and easily attainable and implementable ways in which the Streaming Filtering Solution may determine that the client will not request any further media files.

If the Streaming Filtering Solution determines that the client will not request any further media segment files for a particular movie or streaming session then, at step 955, the Streaming Filtering Solution completes streaming of the movie.

It is not necessary to perform these steps in the order they are number, described, or shown in FIG. 8 or 9. Some or all of the steps are not necessarily dependent on each other and may be performed in more than one sequence, or grouped with other steps, or performed in part or in whole simultaneously with other steps. For example, instead of generating media segment files as it iterates through each filterable element, the Streaming Filtering Solution may iterate through all filterable elements, storing information regarding generation of media segment files, and then generate the media segment files all at once after iterating through all of the filterable elements. In another embodiment, the Streaming Filtering Solution may elicit preferences from a client as it iterates through the filterable elements and encounters new categories and subcategories of filterable elements.

In another alternative embodiment, the Streaming Filtering Solution may determine how to divide content into media segment files based, at least in part, on characteristics of underlying technologies, implementations of the technologies, hardware characteristics, software characteristics, or any other factors that may affect identifying, preparing, providing, or playing back content in media segment files. For example, experience has shown that some systems cannot smoothly handle sequences of consecutive short media segment files. The length of such a "short" media segment file may depend on the particular system. For example, in a content scene including multiple swear words in a short duration, the Streaming Filtering Solution may determine that each swear word may comprise its own independent filterable element, which may result in generating a different media segment file for each swear word. In some systems and technology implementations, however, playback may be choppy and manifest other undesirable characteristics when multiple, or too many, short media segment files are temporally adjacent in the streamed content. To overcome this circumstance, the Streaming Filtering Solution may determine to combine some filterable elements into one media segment file, or may otherwise alter the grouping of content elements into media segment files, to prevent, minimize, or otherwise address undesirable playback characteristics.

The particular terms employed herein, i.e., "Streaming Filtering Solution," "content map," "filterable element," "filter," "preference," and others, do not limit the scope of the disclosure herein, but are merely abstract terminology used to conveniently describe the invention. As will be appreciated by a person of ordinary skill, the invention disclosed herein may be implemented using a wide spectrum of computer, networking, data structure, storage, algorithmic, and other technologies and approaches.

The invention disclosed and described herein may substantially improve a user's viewing experience by smoothing out filtered content. For example, instead of omitting all sound to "filter" a swear word, the disclosed Streaming Filtering Solution may merely turn down the volume on the channel carrying the voice component of the sound, but leave unchanged the other channels, e.g., background music/soundtrack, special effects, etc. In another example, instead of omitting the entirety of a segment including extreme violence, the Streaming Filtering Solution may merely blur the portion of the display with the violence, or crop the display, minimizing the intrusiveness of filtering. The invention and innovations disclosed herein may result in filtered content wherein the filtering is far less conspicuous than filtering my omitting entire segments or all the sound.

One important feature of the disclosed HLS Implementation is its ability to comply with the Family Home Movie Act of 2005, which is codified at 17 U.S.C. §110(11). The Family Home Movie Act of 2005 provides that it is not copyright infringement to "mak[e] imperceptible, by or at the direction of a member of a private household, [ ]limited portions of audio or video content of a motion picture, during a performance in or transmitted to that household for private home viewing, from an authorized copy of the motion picture, or [to] creat[e] or provi[de] a computer program or other technology that enables such making imperceptible and that is designed and marketed to be used, at the direction of a member of a private household, for such making imperceptible, if no fixed copy of the altered version of the motion picture is created by such computer program or other technology."

Because, in at least one or more implementations as described herein above, the Streaming Filtering Solution does not make a fixed copy of a filtered media segment file, but instead may generate and stream the filtered media segment file in real-time, or in another manner in which no fixed copy is made, the invention described herein may comply with the Family Home Movie Act of 2005.

A person of ordinary skill in the art will appreciate that the invention and technology described herein can take the form of an entirely hardware implementation, an entirely software implementation, or implementations containing both hardware and software elements.

Further, as described above, the invention described herein is not limited to HLS, but may be reasonably implemented using other streaming technologies and protocols including but not limited to MPEG Dash, Microsoft Smooth Streaming, RTP, and RTSP.

What is claimed is:

1. A method for filtering streamed content, comprising:
   obtaining a content map for the content, wherein the content map identifies one or more filterable elements;
   obtaining a filter, the filter identifying one or more filterable content categories;
   dividing the content into one or more segments such that each filterable element is associated with one or more segments;
   generating unfiltered segment files for some or all of the segments;
   receiving a request from the client for one of the segments;
   determining, based on the filter, to provide a filtered version of the requested segment;
   providing the filtered version of the requested segment.

2. The method of claim 1, wherein at least one of the filterable elements identifies at least a begin time and an end time associated with the filterable element.

3. The method of claim 1, wherein at least one of the filterable elements is associated with at least one filterable content category.

4. The method of claim 1, wherein at least one of the filterable elements is associated with a filterable content category and a filterable content subcategory.

5. The method of claim 1, wherein at least one of the filterable elements is associated with one or more audio channels or sets of audio channels.

6. The method of claim 1, wherein at least one of the filterable elements is associated with an identification of a portion of a display area associated with the filterable element.

7. The method of claim 1, wherein the filter comprises one or more preferences, each preference being associated with at least one filterable content category.

8. The method of claim 1, wherein determining to provide a filtered version of the requested segment comprises determining that a filterable element associated with a segment matches one or more of the filterable content categories identified in the filter.

9. The method of claim 8, wherein each filterable element is associated with at least one filterable content category, and determining that a filterable element associated with a segment matches one or more of the more of the filterable content categories identified in the filter comprises determining that at least one of the filterable content categories associated with the filterable element matches at least one of the filterable content categories identified in the filter.

10. The method of claim 1, wherein:
    the streaming technology for filtering streamed content is HLS;
    each filterable element identifies at least a begin time and an end time;
    each filterable element is associated with one or more filterable content categories;
    dividing the content into one or more segments comprises determining how to divide the content into media segment files;
    generating unfiltered segments comprises generating unfiltered media segment files;
    receiving a request from the client for one of the segments comprises receiving a request from the client for a media segment file;
    determining, based on the filter, to provide a filtered version of the requested segment comprises determining that at least one filterable content category associated with a filterable element, which is associated with the requested segment, matches a filterable content category identified by the filter; and
    providing the filtered version of the requested segment comprises dynamically generating a filtered media segment file based on the requested media segment file and on the filter, and providing the dynamically generated filtered media segment file to the client.

11. The method of claim 10, wherein dividing the content into one or more segments further comprises dividing the content into segments of varying chronological length, the length of at least one of the segments being based on the length of one of the filterable elements.

12. The method of claim 10, wherein no fixed copies of any filtered media segment files are created.

13. The method of claim 1, wherein at least one of the filterable elements identifies at least one of a begin time, and end time, an audio characteristic, and a video characteristic.

14. The method of claim 1, wherein the filter further identifies, for at least one of the identified filterable content categories, a filter action.

15. The method of claim 1, wherein the filter action comprises at least one of completely skipping a segment, completely muting audio, completely skipping video, completely muting one or more audio channels, partially muting one or more audio channels, increasing the volume on one or more audio channels, cropping the video, blurring all of the video, blurring part of the video, blocking out or covering part of the video, replacing all of the video with alternate video content, replacing part of the video with alternate video content, replacing all of the audio with alternate audio content, and replacing part of the audio with alternate audio content.

16. The method of claim 1, wherein generating a content map comprises at least one of receiving content mapping information from a human user, receiving content mapping information from a community or crowd-based resource, and programmatically generating content mapping information.

17. A system for filtering streamed content, comprising a streaming filtering system configured to:
    obtain a content map for the content, wherein the content map identifies one or more filterable elements;
    obtain a filter, the filter identifying one or more filterable content categories;
    divide the content into one or more segments such that each filterable element is associated with one or more segments;
    generate unfiltered segment files for some or all of the segments;
    receive a request from the client for one of the segments;
    determine, based on the filter, to provide a filtered version of the requested segment;
    provide the filtered version of the requested segment.

18. The system of claim 17, wherein at least one of the filterable elements identifies at least a begin time and an end time associated with the filterable element.

19. The system of claim 17, wherein at least one of the filterable elements is associated with at least one filterable content category.

20. The system of claim 17, wherein at least one of the filterable elements is associated with a filterable content category and a filterable content subcategory.

21. The system of claim 17, wherein at least one of the filterable elements is associated with one or more audio channels or sets of audio channels.

22. The system of claim 17, wherein at least one of the filterable elements is associated with an identification of a portion of a display area associated with the filterable element.

23. The system of claim 17, wherein the filter comprises one or more preferences, each preference being associated with at least one filterable content category.

24. The system of claim 17, wherein determining to provide a filtered version of the requested segment comprises determining that a filterable element associated with a segment matches one or more of the filterable content categories identified in the filter.

25. The system of claim 24, wherein each filterable element is associated with at least one filterable content category, and determining that a filterable element associated with a segment matches one or more of the more of the filterable content categories identified in the filter comprises determining that at least one of the filterable content categories associated with the filterable element matches at least one of the filterable content categories identified in the filter.

26. The system of claim 17, wherein:
    the streaming technology for filtering streamed content is HLS;
    each filterable element identifies at least a begin time and an end time;
    each filterable element is associated with one or more filterable content categories;
    dividing the content into one or more segments comprises determining how to divide the content into media segment files;
    generating unfiltered segments comprises generating unfiltered media segment files;
    receiving a request from the client for one of the segments comprises receiving a request from the client for a media segment file;
    determining, based on the filter, to provide a filtered version of the requested segment comprises determining that at least one filterable content category associated with a filterable element, which is associated with the requested segment, matches a filterable content category identified by the filter; and
    providing the filtered version of the requested segment comprises dynamically generating a filtered media segment file based on the requested media segment file and on the filter, and providing the dynamically generated filtered media segment file to the client.

27. The system of claim 26, wherein dividing the content into one or more segments further comprises dividing the content into segments of varying chronological length, the length of at least one of the segments being based on the length of one of the filterable elements.

28. The system of claim 26, wherein no fixed copies of any filtered media segment files are created.

29. The system of claim 17, wherein at least one of the filterable elements identifies at least one of a begin time, and end time, an audio characteristic, and a video characteristic.

30. The system of claim 17, wherein the filter further identifies, for at least one of the identified filterable content categories, a filter action.

31. The system of claim 17, wherein the filter action comprises at least one of completely skipping a segment, completely muting audio, completely skipping video, completely muting one or more audio channels, partially muting one or more audio channels, increasing the volume on one or more audio channels, cropping the video, blurring all of the video, blurring part of the video, blocking out or covering part of the video, replacing all of the video with alternate video content, replacing part of the video with alternate video content, replacing all of the audio with alternate audio content, and replacing part of the audio with alternate audio content.

32. The system of claim 17, wherein generating a content map comprises at least one of receiving content mapping information from a human user, receiving content mapping information from a community or crowd-based resource, and programmatically generating content mapping information.

* * * * *